75-27.
-28-75 XR SR
RE28322
3687,205
Jan. 28, 1975
E. A. MORI
Re. 28,322
FLOATING RIG MOTION COMPENSATOR
Original Filed Oct. 28, 1970
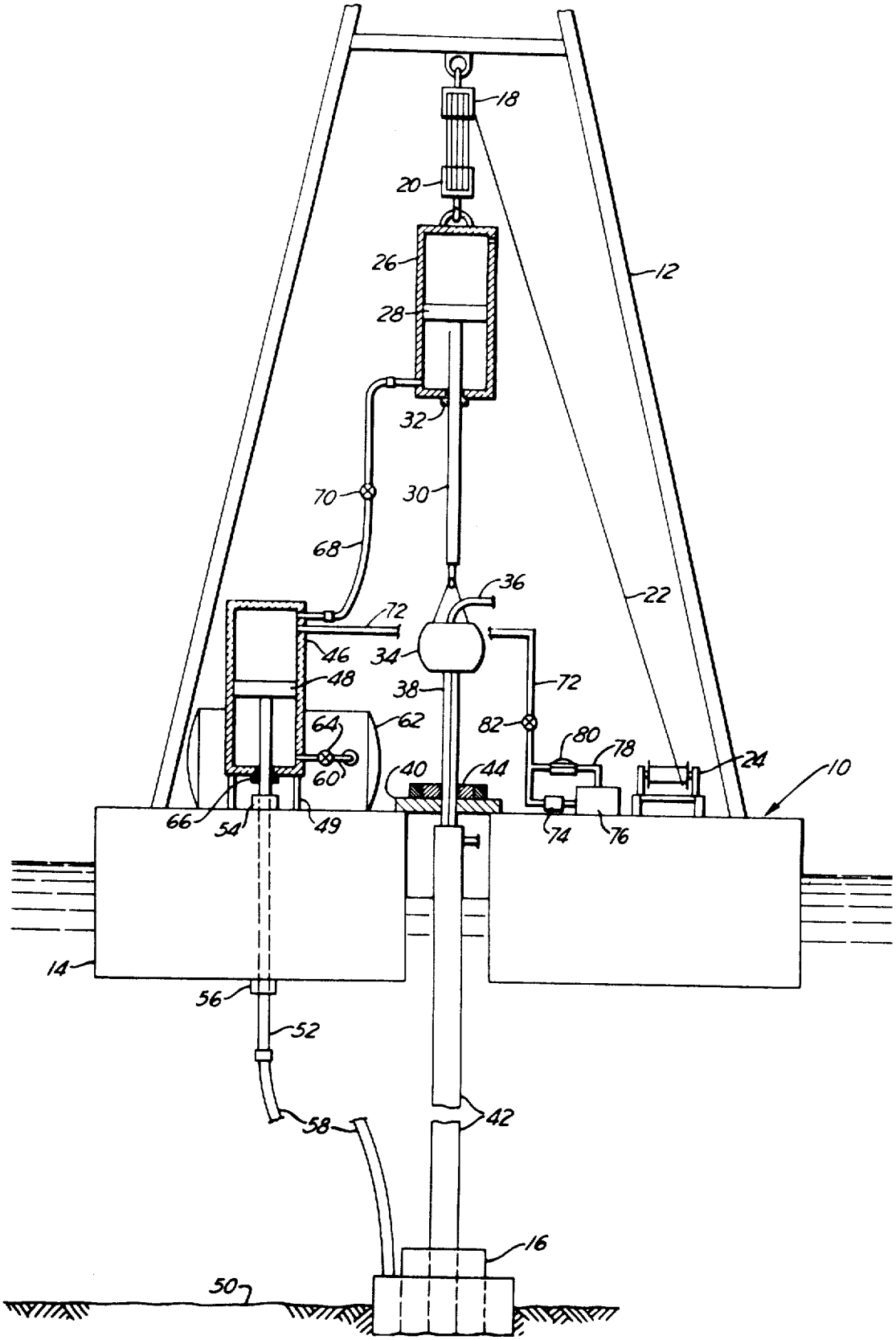

United States Patent Office

Re. 28,322
Reissued Jan. 28, 1975

28,322

FLOATING RIG MOTION COMPENSATOR

Ernest A. Mori, Hampton Township, Allegheny County, Pa., assignor to Gulf Research & Development Co., Pittsburgh, Pa.

Original No. 3,687,205, dated Aug. 29, 1972, Ser. No. 84,579, Oct. 28, 1970. Application for reissue Apr. 4, 1974, Ser. No. 457,790

Int. Cl. E21b *7/12, 19/08*

U.S. Cl. 175—5 9 Claims

Matter enclosed in heavy brackets [ ] appears in the original patent but forms no part of this reissue specification; matter printed in italics indicates the additions made by reissue.

ABSTRACT OF THE DISCLOSURE

Apparatus for compensating for the vertical motion of a floating rig caused by wave action to hold a tool at a constant depth in which the tool is suspended from a piston supported in a cylinder by a hydraulic fluid under pressure. The cylinder is hung from the traveling block of the rig whereby the cylinder moves vertically with the rig. A compensating cylinder mounted on the rig has a piston urged upwardly therein by compressed gas and limited in upward movement by a cable connected to the wellhead. A conduit connecting the two cylinders allows hydraulic fluid to be displaced from one cylinder to the other in response to wave-induced vertical motion of the drilling rig. A valve in the conduit allows slackening of the cable when the load supported by the piston is reduced.

This invention relates to apparatus for working on offshore wells from a floating rig and more particularly to apparatus for compensating for the vertical motion of the rig caused by waves.

The search for oil has resulted in drilling wells at offshore locations in water of increasing depths that make bottom-supported drilling platforms uneconomical and have caused floating drilling rigs to be used. One problem that is encountered when drilling from floating drilling rigs is variation in the weight on the drill bit resulting from vertical movement of the rig caused by waves. Unless equipment is provided to counteract the wave action, large waves may alternately lift the drill bit off the bottom and cause excessive weights on the drill bit.

One technique that has been used to counteract wave action has been to suspend the drill string from a piston movable vertically in a cylinder mounted on the floating drilling rig. The piston is supported by hydraulic fluid under pressure. The weight applied to the drill bit is the difference between the weight of the drill string and the upward force applied against the piston by the hydraulic fluid. The weight applied to the drill bit can be maintained constant by maintaining a constant pressure on the hydraulic fluid. That technique requires a large pump to pump hydraulic fluid into the cylinder rapidly enough to maintain a constant pressure in the cylinder when the movement of the drilling rig is downward and relative movement of the piston in the cylinder is upward.

It has been proposed to install a second cylinder on the drilling rig [the second] *with* a conduit connecting the upper end of the second cylinder to the lower end of the first cylinder. The cross-sectional area of the second cylinder is equal to the effective cross-sectional area of the first cylinder below the piston so that movement of the piston in the first cylinder results in a corresponding movement of a piston mounted in the second cylinder. The piston in the second cylinder is continuously urged upward by a force exceeding that exerted by the hydraulic fluid, but a connection to the marine floor prevents upward movement of the second cylinder above a predetermined level. A serious disadvantage of such an arrangement is that a reduction of the weight on the drill string such as occurs during a round trip places excessive tension on the means connecting the marine floor with second piston.

This invention resides in apparatus for compensating for wave action on a floating drilling rig in which a first cylinder, referred to as a supporting cylinder, suspended from the traveling block of a floating drilling rig has a supporting piston slidable therein from which the drill string is suspended. A second cylinder, referred to as a compensating cylinder, with a compensating piston slidable therein has dimensions such that the cross-sectional area of the compensating cylinder above the compensating piston is equal to the effective cross-sectional area of the supporting cylinder below the piston. A hydraulic fluid fills the supporting cylinder below the supporting piston and the compensating cylinder above the compensating piston. An equalizing conduit connects the upper end of the compensating cylinder with the lower end of the supporting cylinder to permit displacement of hydraulic fluid from one cylinder to the other and thereby cause movement of the two pistons to be equal. Compressed gas below the second piston urges that piston upwardly to maintain a cable connected to the second piston and to the marine floor in tension. A valve in the equalizing conduit permits reduction of tension in the connecting cable when the load on the drill string is reduced.

The sole figure of the drawings is a diagrammatic elevational view, partially in vertical section, of a floating drilling rig with the wave motion compensating apparatus of this invention.

For convenience in description, this invention will be described with reference to its use during drilling from a floating rig. Referring to the drawings, a floating drilling rig indicated generally by reference numeral 10 is shown with a derrick 12 mounted on its deck. The drilling rig is shown on pontoons 14 floating in position above a wellhead 16. A crown block 18 suspended from the upper end of the derrick 12 supports a travelling block 20. A line 22 extends from the crown block 18 to draw works 24 mounted on the deck of the floating drilling rig for raising and lowering the traveling block 20.

Suspended from the travel block 20 is a supporting cylinder 26 having a supporting piston 28 slidable therein. Supporting cylinder 26 has a length at least equal to the maximum wave height likely to be encountered while drilling continues. The portion of supporting cylinder 26 below piston 28 is filled with a liquid referred to hereinafter as a hydraulic fluid, and the space above the piston 28 is vented to the atmosphere. A piston rod 30 extends downwardly from the lower surface of piston 28 through the lower end of the cylinder 26 and supports a swivel 34. Leakage around the piston rod is prevented by a suitable packing gland 32. A mud line 36 enters the upper end of swivel 34 for the delivery of drilling mud into the swivel from which the drilling mud flows into a kelly 38. Kelly 38 extends downwardly from the swivel through a rotary table 40 and is connected to drill pipe which extends downwardly through casing 42. A clamp 44 is secured to the deck of the drilling rig 10 through the housing for the rotary table 40.

A compensating cylinder 46 of the same minimum length as cylinder 26 and having a cross-sectional area equal to the effective cross-sectional area of cylinder 26 below piston 28 is secured to the drilling rig 10 by suitable means such as legs 49 secured to the deck of the drilling rig. Slidable within the compensating cylinder 46 is a compensating piston 48. A piston rod 52 extends downwardly from the lower surface of compensating piston 48 through guide bearings 54 and 56. A cable 58 is connected to the lower end of piston rod 52 and extends downwardly for connection to the wellhead of well 16 to limit upward movement of the piston. If desired, cable 58 can be connected to a suitable anchor secured to the marine floor 50 instead of *to* the wellhead.

A line 60 opens from compensating cylinder 46 below the piston 48 and extends into a gas accumulator 62 which preferably has a volume 4 to 10 times the volume within cylinder 46 below piston 48. Line 60 is provided with a valve 64 for control of flow through the line. Leakage of the compressed gas around piston rod 52 is prevented by a suitable packing gland 66.

A flexible pressure [equaling] *equalizing* conduit 68 extends from the upper end of compensating cylinder 46 into the lower end of supporting cylinder 26 below the piston 28. Equalizing conduit 68 is long enough to permit the traveling block 20 to be raised to its uppermost position. A valve 70 in pressure equalizing conduit 68 prevents flow through the line during round trips, as is hereinafter described.

Also connected into compensating cylinder 46 above piston 48 is a hydraulic fluid supply line 72 from a pump 74 connected to a hydraulic fluid reservoir 76. A pressure relief line 78, which includes a pressure regulating valve 80, extends from line 72 downstream of pump 74 back to the reservoir 76 for control of the pressure of the hydraulic fluid in the system. A valve 82 is provided in line 72 to isolate the hydraulic fluid supply system from cylinder 26 during a round trip.

In the operation of the apparatus of this invention, after locating drilling rig 10 over well head 16 and connecting line 58 to the wellhead or a suitable anchor, the drill string is run into the well with sufficient drill collars to provide the desired weight on the drill bit and tension in the drill string. Hydraulic fluid, ordinarily a hydrocarbon liquid, is pumped through line 72 into cylinder 46 and through equalizing conduit 68 into cylinder 26 to maintain a pressure on the bottom of piston 28 to adjust the weight on the drill bit as desired. For example, the total weight of the drill string may be 350,000 pounds and a weight of 50,000 pounds is desired on the drill bit. The pressure on the hydraulic liquid within cylinder 26 is then regulated to exert an upward force of 300,000 pounds on the piston 28. Valve 64 in line 60 is open, and the gas pressure in the lower portion of compensating cylinder 46 is maintained high enough to overcome the pressure exerted by the hydraulic fluid on the upper surface of piston 48 and the weight of cable 58 and thereby maintain the cable 58 in tension to fix the distance of the piston 48 above the marine floor 50.

If during the drilling operation, the waves move the floating drilling rig 10 upwardly, the supporting cylinder 26 and compensating cylinder 46 move up with the rig. The piston 48 remains stationary and thereby increases the space within compensating cylinder 46 above the piston. The upward movement of cylinder 26 tends to increase the pressure below piston 28, but hydraulic fluid flows through compensating conduit 68 into cylinder 46 to maintain a constant pressure under piston 28. Because there is no net change in total volume of the portion of cylinders 26 and 46 occupied by the hydraulic fluid, it is necessary to supply hydraulic fluid by means of pump 74 only in a volume sufficient to replace leakage.

On downward movement of the drilling rig 10, the two cylinders move downwardly. The compressed gas in the lower portion of compensating cylinder 46 maintains cable 58 in tension and the piston 48 at a fixed distance above the marine floor. Hydraulic fluid is displaced from the upper portion of cylinder 46 through equalizing conduit 68 into the lower portion of cylinder 26. Again, since the increase in volume of the portion of cylinder 26 occupied by the hydraulic fluid is equal to the decrease in volume of the portion of cylinder 46 occupied by the hydraulic fluid, no flow through supply line 72 is required to maintain a constant pressure on the hydraulic fluid within the cylinders.

Before beginning a round trip or pulling the drill string for any reason, valve 82 in the hydraulic fluid supply line 72 is closed. Cylinder 26 is then lifted by means of draw works 24, and, as a result of lifting the drill bit off bottom, the weight supported by piston 28 is increased. Piston 28 moves downwardly within cylinder 26 and displaces hydraulic fluid through line 68 into the upper end of cylinder 46 until the gas below piston 48 is compressed to a pressure high enough to balance the increased pressure on the hydraulic fluid. The downward movement of piston 48 slackens cable 58. Valve 70 is then closed to hold piston 48 in the lower position and maintain slack in cable 58 as the drill string is pulled even though the weight of the drill string is steadily lessened. In devices heretofore available, the reduced weight of the drill string as the drill pipe was pulled operated to increase the tension on the means connecting the piston 48 with the marine floor. At the time substantially all of the drill string had been pulled, the cable carried substantially the full upward force exerted against the piston 48. Ordinarily, the increased weight on piston 28 as the drill bit is lifted off bottom will compress gas in cylinder 46 enough to lower piston 48 and put the desired slack in cable 58. If additional slack is required, the drill pipe can be clamped in place by clamp 44 before lifting cylinder 26. Lifting cylinder 26 can then be continued until piston 28 rests on the lower end of the cylinder. Piston 48 will move downwardly a corresponding distance to put maximum slack in cable 58.

The compressed gas in cylinder 46 provides a compact means opposing the force of the hydraulic fluid to maintain the piston 48 in the uppermost position and the cable 58 in tension. For example, in the example given, the compressed gas exerts on piston 48 a force of 300,000 pounds to overcome the force of the hydraulic fluid plus the force necessary to maintain cable 58 taut. A float having a volume of at least about 7,000 cubic feet would be required to exert an equivalent force. In addition to being compact, the use of compressed air to oppose the force of the hydraulic fluid on piston 48 allows the entire apparatus to be mounted on the deck, or above the deck, of the drilling rig where it is unaffected by wave or inertia forces. The large volume of the gas accumulator minimizes fluctuations in the pressure of the compressed gas resulting from movement of the compensating piston in the compensating cylinder.

Valve 70 is important to the safe operation of the compensator when the drill string is pulled. If flow from compensating cylinder 46 could not be prevented, the full force of the compressed gas on piston 48 would be applied to cable 58 when all of the drill string has been pulled from the hole. A cable able to withstand such a force would be objectionable both in bulk and cost. Clamp 44 provides another means for slackening cable 58 and is useful when the weight of the drill string is not enough to cause the desired slackening.

The compensator described herein is of principal utility in maintaining a constant weight on a drill bit during drilling wells from a floating drilling rig. It is not, however, restricted to such use. The compensator also provides means for suspending a tool from a floating rig at a constant depth in the well.

I claim:

1. In apparatus for suspending a tool in a well from a floating rig having a traveling block suspended therefrom, the improvement comprising a suspending cylinder *adapted to be* supported by the traveling block, a suspending piston slidable in the suspending cylinder, *a piston rod extending downwardly from the suspending piston through the suspending cylinder for connection to the tool,* [said tool being suspended from the suspending piston and extending downwardly into the well,] a compensating cylinder *adapted to be* mounted on the rig, a compensating piston slidable in the compensating cylinder, connecting means extending downwardly from the compensating piston *for connection* [and connected] to the marine floor for limiting upward movement of the compensating piston, means for supplying compressed gas into the compensating cylinder below the compensating piston to maintain the connecting means under tension and the compensating piston at its maximum elevation above the marine floor, an equalizing conduit extending from the compensating cylinder above the compensating piston to the suspending cylinder below the suspending piston, the effective cross-sectional area of the suspending cylinder below the suspending piston being equal to the cross-sectional area of the compensating cylinder above the compensating piston, and *means for maintaining* a hydraulic fluid in the suspending cylinder below the suspending piston and in the compensating cylinder above the compensating piston.

2. Apparatus as set forth in claim 1 including means for supplying hydraulic fluid to the cylinders under pressure to maintain pressure in the cylinders.

3. Apparatus as set forth in claim 1 including a valve in the equalizing conduit to allow closing the conduit.

4. Apparatus as set forth in claim 3 including clamping means for preventing vertical movement of the tool relative to the floating rig, and means for elevating the suspending cylinder.

5. Apparatus as set forth in claim 3 in which the connecting means extending downwardly from the compensating cylinder is connected to the wellhead below the surface of the water.

6. Apparatus as set forth in claim 3 in which the floating rig is a drilling rig and the tool is drill pipe with a drill bit on its lower end.

7. Apparatus as set forth in claim 3 in which the means for supplying compressed gas comprise a gas accumulator having a volume 4 to 10 times the volume of the compensating cylinder and a conduit from the gas accumulator opening into the compensating cylinder below the compensating piston.

8. Apparatus as set forth in claim 3 including means for supplying hydraulic fluid to the cylinders to maintain the desired pressure in the cylinders, said means comprising a hydraulic fluid storage tank, a hydraulic fluid supply line from the storage tank to supply hydraulic fluid to the cylinders, a pump in the hydraulic fluid supply line, a recycle line connecting the hydraulic fluid supply line downstream of the pump with the hydraulic fluid supply storage tank, and a pressure regulating valve in the recycle line.

9. Apparatus as set forth in claim 8 in which the hydraulic fluid supply line opens into the compensating cylinder, and valve means in the hydraulic fluid supply line permit closing the line to flow.

References Cited

The following references, cited by the Examiner, are of record in the patented file of this patent or the original patent.

UNITED STATES PATENTS

| | | | |
|---|---|---|---|
| 3,158,206 | 11/1964 | Kammerer | 175—5 |
| 3,158,208 | 11/1964 | Kammerer | 175—5 X |
| 3,208,728 | 9/1965 | Parks | 175—5 X |
| 3,403,728 | 10/1968 | Richardson et al. | 175—5 X |
| 3,714,995 | 2/1973 | Hanes et al. | 175—27 |

FRANK L. ABBOTT, Primary Examiner

R. E. FAVREAU, Assistant Examiner

U.S. Cl. X.R.

175—27